United States Patent
Hannemann et al.

(10) Patent No.: US 10,457,879 B2
(45) Date of Patent: Oct. 29, 2019

(54) BLOCKAGE-FREE WATER OVERFLOW FROM THE WATER JACKET OF A QUENCHER INTO THE QUENCHING CHAMBER

(71) Applicant: Siemens Aktiengesellschaft, Munich (DE)

(72) Inventors: Frank Hannemann, Röttenbach (DE); Tino Just, Freiberg (DE); Friedemann Mehlhose, Freiberg (DE); Jörg Werner, Dresden (DE)

(73) Assignee: Siemens Aktiengesellschaft, Munich (DE)

( * ) Notice: Subject to any disclaimer, the term of this patent is extended or adjusted under 35 U.S.C. 154(b) by 50 days.

(21) Appl. No.: 15/753,239

(22) PCT Filed: Jul. 5, 2016

(86) PCT No.: PCT/EP2016/065790
§ 371 (c)(1),
(2) Date: Feb. 16, 2018

(87) PCT Pub. No.: WO2017/036634
PCT Pub. Date: Mar. 9, 2017

(65) Prior Publication Data
US 2018/0237708 A1   Aug. 23, 2018

(30) Foreign Application Priority Data
Sep. 2, 2015   (DE) .................. 10 2015 216 783

(51) Int. Cl.
*C10J 3/76*   (2006.01)
*C10J 3/48*   (2006.01)
(Continued)

(52) U.S. Cl.
CPC ............ *C10J 3/76* (2013.01); *C10J 3/485* (2013.01); *C10J 3/84* (2013.01); *C10J 3/845* (2013.01); *C10K 1/101* (2013.01); *G05D 9/12* (2013.01)

(58) Field of Classification Search
CPC ..... C10J 3/485; C10J 3/84; C10J 3/845; C10J 2200/09; C10J 3/76; C10K 1/101
See application file for complete search history.

(56) References Cited

U.S. PATENT DOCUMENTS 4,848,982 A * 7/1989 Tolle .................. C10J 3/00
48/69
2008/0005966 A1   1/2008 Fischer et al.
(Continued)

FOREIGN PATENT DOCUMENTS

DE   102006031816 A1   1/2008
DE   102012215898 A1   3/2014
DE   102012216678 A1   3/2014

OTHER PUBLICATIONS

International Search Report dated Oct. 4, 2016, for PCT/EP2016/065790.

*Primary Examiner* — Imran Akram
(74) *Attorney, Agent, or Firm* — Beusse Wolter Sanks & Maire

(57) ABSTRACT

A quenching chamber of an entrained-flow gasifier that gasifies fuels at temperatures of up to 1,800° C. and pressures of up to 10 MPa, wherein an annular chamber through which cooling water flows is formed between the pressure-bearing tank and the inner jacket. The overflow water is discharged from the annular chamber (skirt water) into the quenching chamber via the sleeve of a quenching lance, wherein blocking by the spray cone of the spray nozzle is prevented. The cooling water from the annular chamber is used in addition to the quenching water from the spray (Continued)

nozzle to cool and clean the raw gas in the quenching chamber.

6 Claims, 3 Drawing Sheets

(51) Int. Cl.
*C10J 3/84* (2006.01)
*C10K 1/10* (2006.01)
*G05D 9/12* (2006.01)

(56) References Cited

U.S. PATENT DOCUMENTS

| | | | |
|---|---|---|---|
| 2011/0023362 A1* | 2/2011 | Kirchhubel | C10J 3/485 48/71 |
| 2012/0110906 A1* | 5/2012 | Kuske | C10J 3/485 48/87 |
| 2014/0069525 A1 | 3/2014 | Fischer et al. | |
| 2015/0059246 A1* | 3/2015 | Fischer | C10K 1/06 48/128 |
| 2015/0090938 A1* | 4/2015 | Meyer | C10J 3/506 252/373 |
| 2015/0218471 A1* | 8/2015 | Hannemann | C10J 3/485 422/187 |

* cited by examiner

BLOCKAGE-FREE WATER OVERFLOW FROM THE WATER JACKET OF A QUENCHER INTO THE QUENCHING CHAMBER

CROSS REFERENCE TO RELATED APPLICATIONS

This application is the US National Stage of International Application No. PCT/EP2016/065790 filed Jul. 5, 2016, and claims the benefit thereof. The International Application claims the benefit of German Application No. DE 102015216783.6 filed Sep. 2, 2015. All of the applications are incorporated by reference herein in their entirety.

FIELD OF INVENTION

The invention relates to a device for discharging cooling water from a water-filled annular chamber for cooling the pressure jacket into a quenching chamber in which hot, dust- and slag-carrying raw gas is cooled.

The invention relates to a technology for entrained-flow gasification in which solid and liquid fuels are converted by a gasification medium containing free oxygen under pressures of up to 10 MPa and temperatures of up to 1800° C. into an $H_2$— and CO-rich raw gas. In entrained-flow gasification, the raw gas, which leaves the reaction chamber at temperatures of up to 1800° C. together with airborne dust and the fuel ash melted into slag, is scrubbed in a quenching chamber by the injection of water in excess and cooled to water vapor saturation.

BACKGROUND OF INVENTION

Patent document DE 10 2006 031 816 discloses a quencher for an entrained-flow gasifier in which the cooling water introduced into the quenching chamber for cooling is divided up, wherein one part is injected in a finely distributed manner into the quenching chamber designed as a free space and a further part, for protecting the pressure-bearing container wall, is fed in at the bottom into an annular gap between the pressure-bearing container wall and an inserted metal apron, which can also be divided into two over the height, and this part of the cooling water flows upward in the annular gap, with the result that the jacket is protected from thermal overloading. The rising quenching water is heated up by the very good thermal transfer or, when using pre-heated quenching water, the heat loss in the quenching chamber is minimized. The water which overflows at the weirs runs, with the formation of a water film, on the inner wall of the jacket into the water bath situated at the bottom.

A disadvantage with the described solution is the limited operating time of the overflow weirs on account of blockages. The entry and the precipitations of alkaline-earth metal carbonates and deposits of fine dust causes the formation of solid caking in the overflow weirs in the course of a short operating time. The deposits lead to the closure of the annular gap and impede the outflow of the cooling water from the jacket annular space. The weir overflows of the quencher have to be cleaned at regular intervals with considerable work effort.

Patent document DE 10 2012 215 898 A1 discloses the use of a sleeve, which encases a quenching nozzle, for filling level control in the quenching chamber. The filling level control described in DE 10 2012 215 898 A1 discloses a sleeve which is inserted into the quenching chamber to such an extent that it protrudes beyond the nozzle head of the spray nozzle by from 1 to 4 times the nozzle diameter or is set back to a point behind the jacket apron, wherein the protective sleeve terminates with the inner jacket apron and the annular chamber between the sleeve and spray nozzle is flushed with inert gas.

A problem on which the invention is based is to provide a discharge of cooling water from a water-filled annular chamber for cooling the pressure jacket into a quenching chamber in which hot and dust- and slag-carrying raw gas is cooled, wherein blockages of the water discharge are considerably reduced.

SUMMARY OF INVENTION

This problem is solved by a device having the features of the independent claim.

According to the invention, the overflow water is discharged from the water-filled annular space (skirt water) into the quenching chamber via the sleeve 12 of a quenching lance 7, wherein a blockage is prevented by the spray cone 16 of the spray nozzle 15.

The invention makes use of the finding that, on the one hand, the formation of blockages occurs to an intensified degree at the point where the cooling water from the annular gap enters the quenching chamber, and that, on the other hand, with the cooling water being guided according to the invention from the annular gap 13 through the sleeve 12 of the quenching lance 7, the sharp jet of the spray cone 16 counteracts the formation of blockages. The cooling water from the annular chamber 13 is advantageously used, in addition to the quenching water 16 from the spray nozzle 15, for cooling and cleaning the raw gas 6 in the quenching chamber 1. The effort required for eliminating blockages is considerably reduced.

In one particular embodiment of the invention, a discharge of cooling water from the annular chamber is provided by means of an opening 18 in the sleeve 12 in the region of the annular chamber 13 in such a way that a direct flow of cooling water from the annular chamber through the opening into the interior of the sleeve is provided.

In one particular embodiment of the invention, the jacket overflow is provided by the discharge of the overflow water by means of one or more pipes 10, where appropriate half-pipes, into one or more sleeves which encase the quenching nozzles.

In the case of a jacket annular chamber 13 divided into two, which would conventionally require an upper and a lower weir overflow, the overflow water is fed into the encasing sleeve from above or from below via one or more pipes, where appropriate half-pipes.

According to the invention, the water flowing upward in the annular chamber, the so-called skirt water, is thus discharged by means of one or more pipes/half-pipes. To avoid blockages of the water outlet, the overflow water is discharged by means of sleeves 12 which encase the quenching nozzles and which are inserted into the quenching chamber 1 to such an extent that they project beyond the nozzle head of the spray nozzles 9 by from 1 to 4 times the nozzle diameter. The sleeves can be equipped with a water connection which takes into account a thermal expansion of the metal apron (compensator 11 in pipeline 10).

Advantageous developments of the invention are indicated in the subclaims.

BRIEF DESCRIPTION OF THE DRAWINGS

The invention will be explained in more detail below as an exemplary embodiment with reference to figures in a scope required for understanding. In the figures.

DETAILED DESCRIPTION OF INVENTION

Identical designations designate identical elements in the figures.

Figure 1:
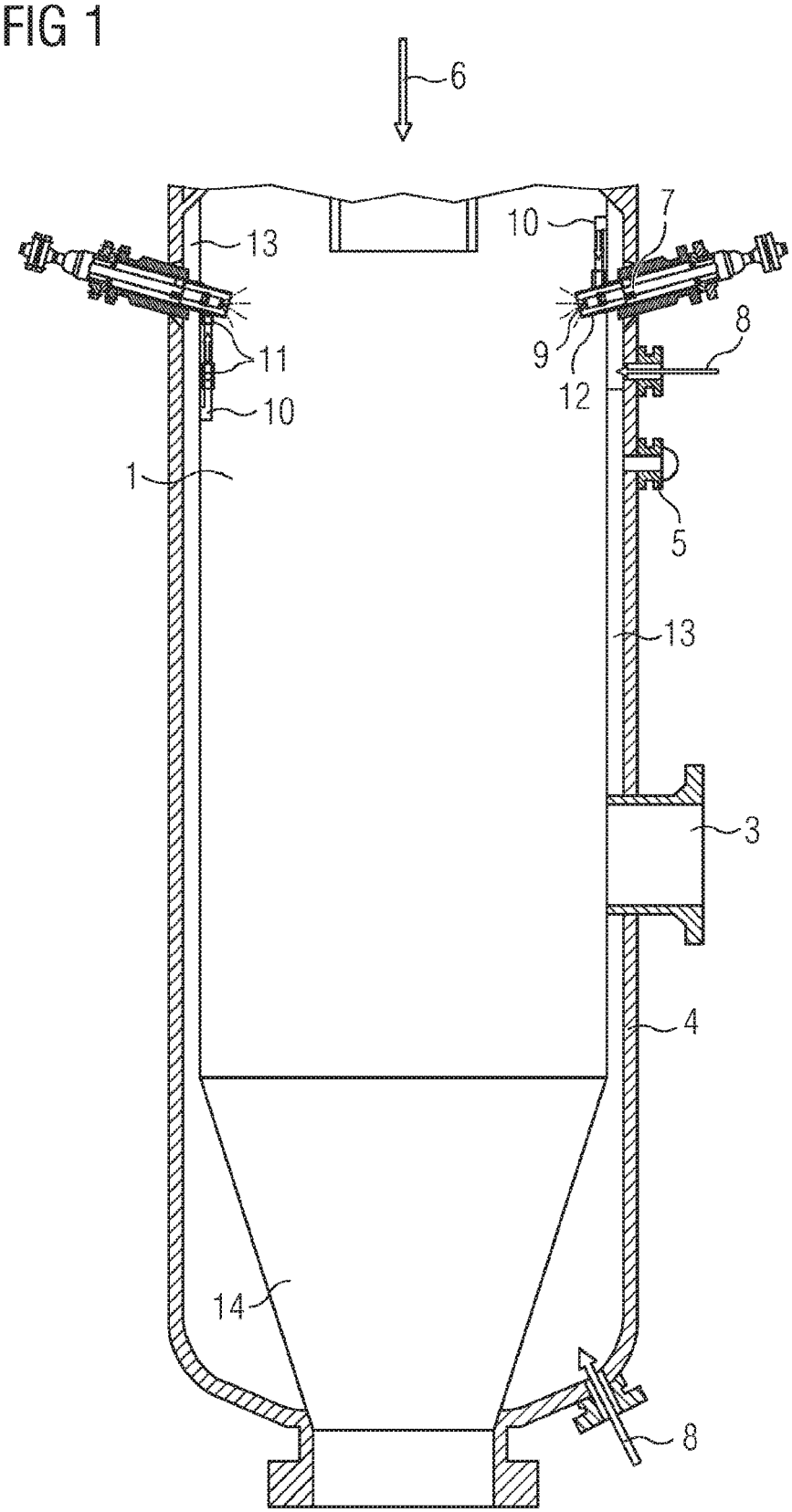
FIG. 1 shows a quenching device with inner jacket and separate skirt flushing.

The quenching device illustrated in FIG. 1 for an entrained-flow gasifier which gasifies fuels, in particular coal dust, under pressures of up to 10 MPa is designed as a free-space quencher. An inner jacket 2 which delimits the quenching chamber is arranged in the pressure-bearing container 4. Cooling water which is fed via a connection 8 rises in the annular chamber 13 between the pressure-bearing container and inner jacket. In the exemplary embodiment according to FIG. 1, two separate annular chambers arranged above one another are provided. A quenching lance 7 is arranged so as to be inclined downward at a small angle in such a way that it penetrates through the container wall and the inner jacket.

Figure 2:
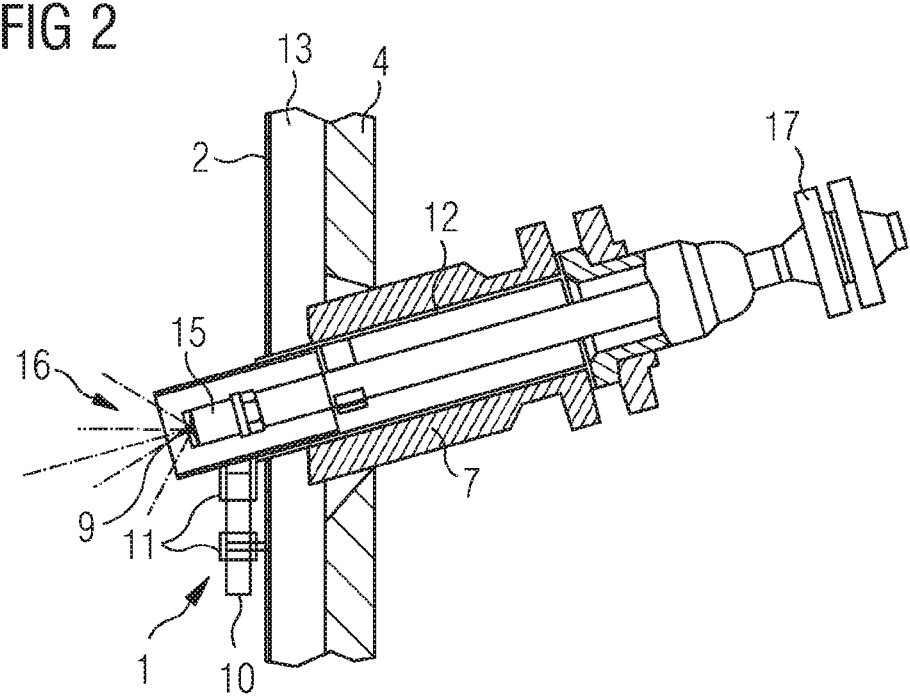
FIG. 2 shows details of a first quenching lance according to the invention.

In the case of the quenching device illustrated in FIG. 2, the quenching lance protrudes into the quenching chamber by way of its sleeve, wherein the pipe 10 which channels the overflow water from the annular chamber is connected to the sleeve 12 from below.

Figure 3:
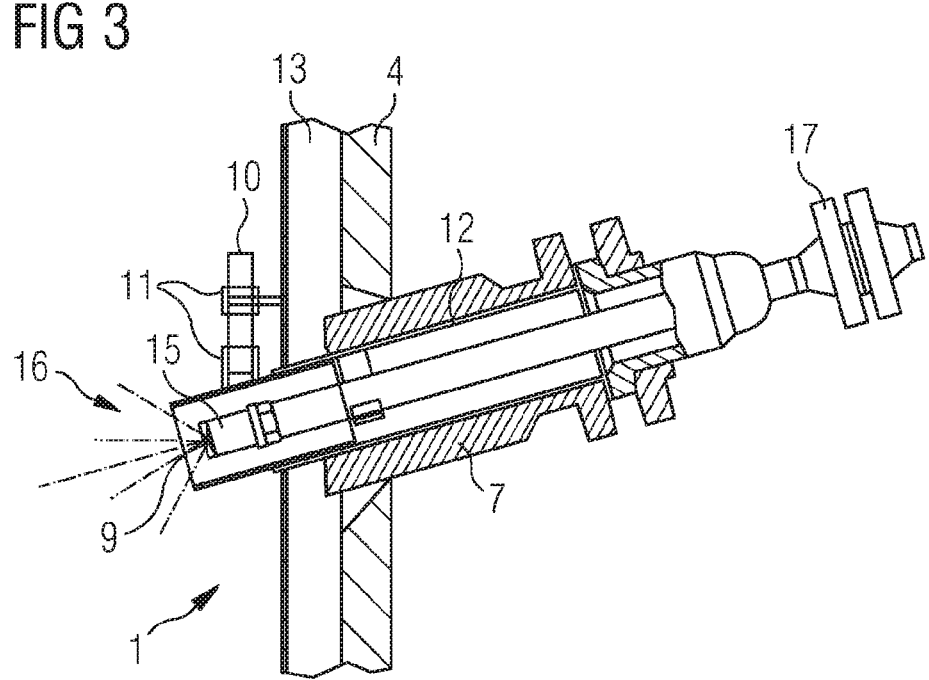
FIG. 3 shows details of a second quenching lance according to the invention.

In the case of the quenching device illustrated in FIG. 3, the quenching lance protrudes into the quenching chamber by way of its sleeve, wherein the pipe 10 which channels the overflow water from the annular chamber is connected to the sleeve 12 from above.

Figure 4:
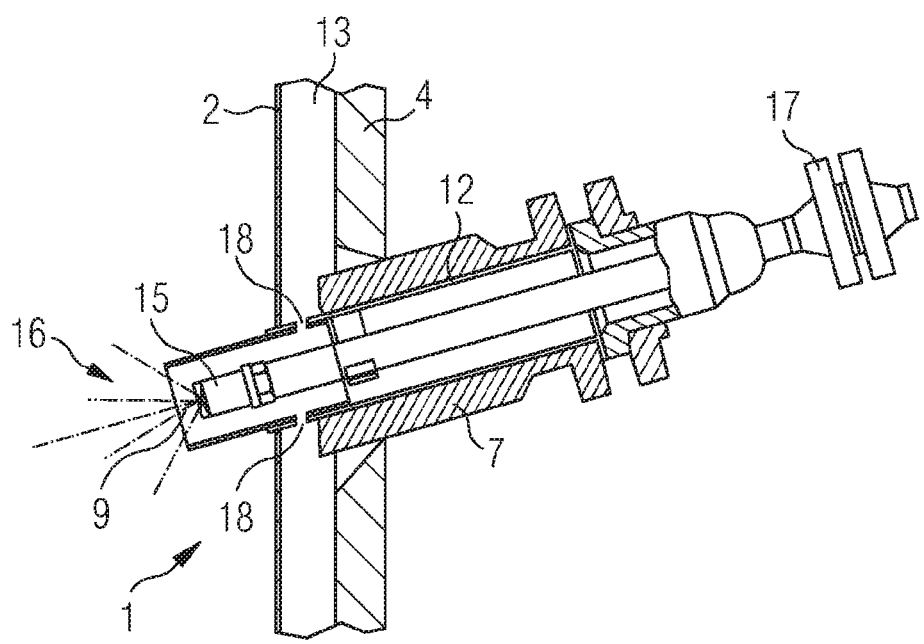
FIG. 4 shows details of a third quenching lance according to the invention.

In the case of the quenching device illustrated in FIG. 4, the quenching lance protrudes into the quenching chamber by way of its sleeve, wherein, at the point where it extends in the annular gap, the sleeve has one or more openings 18 for forwarding the cooling water from the annular gap.

The invention is also provided by a device for discharging cooling water from the water-filled interspace (13) into a quenching chamber (1) which is charged with hot dust- and slag-carrying gasification gas at pressures of up to 10 MPa and temperatures of up to 1800° C., wherein the cooling water is discharged from the water-filled annular chamber into the quenching chamber by means of pipes or half-pipes via a sleeve (12) sprayed by means of a quenching nozzle (9).

In one particular embodiment of the invention, the overflow water is fed to a sleeve (12) via one or more pipes or half-pipes.

In one particular embodiment of the invention, the sleeve (12) terminates with the inner jacket and the nozzle head (9) is set back from the open end of the sleeve (12) by from 1 to 4 times the nozzle diameter.

In one particular embodiment of the invention, a compensator is used for compensating thermal stresses of the inner jacket.

In one particular embodiment of the invention, part of the cooling water introduced into the quenching chamber is fed via the nozzles in such a way that it is finely distributed in the quenching chamber designed as a free space.

The present invention has been explained in detail for illustrative purposes with reference to specific exemplary embodiments. In this regard, elements of the individual exemplary embodiments can also be combined with one another. The invention is therefore not intended to be limited to individual exemplary embodiments, but merely to be limited by the appended claims.

LIST OF REFERENCE SIGNS

1 Quenching chamber
2 Jacket apron, inner jacket, skirt
3 Raw gas outlet
4 Pressure jacket
5 Filling level indication connection, water level of water bath
6 Raw gas and slag inlet
7 Quenching lance
8 Connection for skirt flushing
9 Nozzle head
10 Water discharge from water-filled interspace
11 Compensator
12 Sleeve
13 Water-filled interspace, annular gap, annular chamber, water jacket
14 Quencher sump, water bath
15 Spray nozzle
16 Spray cone
17 Flange connection for feeding quenching water for spray nozzle
18 Aperture in sleeve

The invention claimed is:

1. A device for cooling hot raw gas and slag from the entrained-flow gasification of liquid and solid fuels at temperatures of the raw gas of from 1200 to 1800° C. and pressures of up to 10 MPa, comprising:
   a quenching chamber arranged below a gasification reactor,
   an inner jacket which delimits the quenching chamber arranged in a pressure-bearing container wall in such a way that an annular gap is formed between the container wall and the inner jacket,
   a feed of cooling water provided via a connection piece at a lower end of the annular gap in such a way that said cooling water rises upward in the annular gap, and
   at least one quenching lance which has a quenching nozzle, which is encased by a sleeve, for injecting cooling water into the quenching chamber and which is arranged in such a way that it penetrates through the container wall and the inner jacket,
   wherein the sleeve has an opening for discharge of the cooling water from the annular gap into the quenching chamber at a point where it extends in the annular gap.

2. The device as claimed in claim 1,
   wherein a nozzle head of the quenching nozzle is set back from an open end of the sleeve by from 1 to 4 times the nozzle diameter.

3. The device as claimed in claim 1,
   wherein the sleeve projects beyond the inner jacket into the quenching chamber.

4. The device as claimed in claim 3,
   wherein the annular gap is connected to the sleeve via a pipeline.

5. The device as claimed in claim 4,
   wherein the pipeline has a compensator for length compensation.

6. The device as claimed in claim 1, further comprising:
   a plurality of annular gaps which are separated from one another are arranged at different levels of the quenching chamber, and wherein the sleeve is connected via a pipeline to an outlet of an annular gap which is not identical to the annular gap in which the quenching nozzle together with sleeve is arranged.

\* \* \* \* \*